United States Patent

Oberender et al.

[11] 3,884,025
[45] May 20, 1975

[54] METHOD AND APPARATUS FOR MAKING SZ-TWISTED COMMUNICATIONS CABLE

[75] Inventors: Heinz Oberender, Neustadt, Coburg; Dieter Vogelsberg, Berlin, both of Germany

[73] Assignee: Siemens Aktiengesellschaft, Munich, Germany

[22] Filed: Aug. 10, 1973

[21] Appl. No.: 387,248

[30] Foreign Application Priority Data
Aug. 11, 1972 Germany............................ 2240199

[52] U.S. Cl..................... 57/34 AT; 57/156; 57/160
[51] Int. Cl........................ H01b 13/04; D07b 3/00
[58] Field of Search ......... 57/34 R, 34 AT, 59, 160, 57/156

[56] References Cited
UNITED STATES PATENTS

| | | | |
|---|---|---|---|
| 3,025,656 | 3/1962 | Cook | 57/34 AT |
| 3,052,079 | 9/1962 | Henning | 57/34 AT |
| 3,412,544 | 11/1968 | Sugi et al. | 57/34 AT |
| 3,481,127 | 12/1969 | Vogelsberg | 57/34 AT |
| 3,491,525 | 1/1970 | Sugi | 57/34 AT |
| 3,507,108 | 4/1970 | Yoshimura et al. | 57/34 AT |
| 3,589,118 | 6/1971 | Strelow et al. | 57/34 AT |
| 3,664,108 | 5/1972 | Strelow et al. | 57/34 AT |
| 3,782,092 | 1/1974 | Vogelsberg | 57/34 AT |

*Primary Examiner*—John Petrakes
*Attorney, Agent, or Firm*—Kenyon & Kenyon Reilly Carr & Chapin

[57] ABSTRACT

An improved communications cable and a method of making the same so as to minimize cross talk between units within the cable, in which a plurality of SZ stranded units are twisted to form groups which are then formed into layers so that adjoining units in any one layer have a different distribution function of length of lay and/or distance of reversal points of twist directions and with adjacent units in one layer similarly have different distribution function of length of lay and/or distance between reversal points than units in adjacent layers.

15 Claims, 8 Drawing Figures

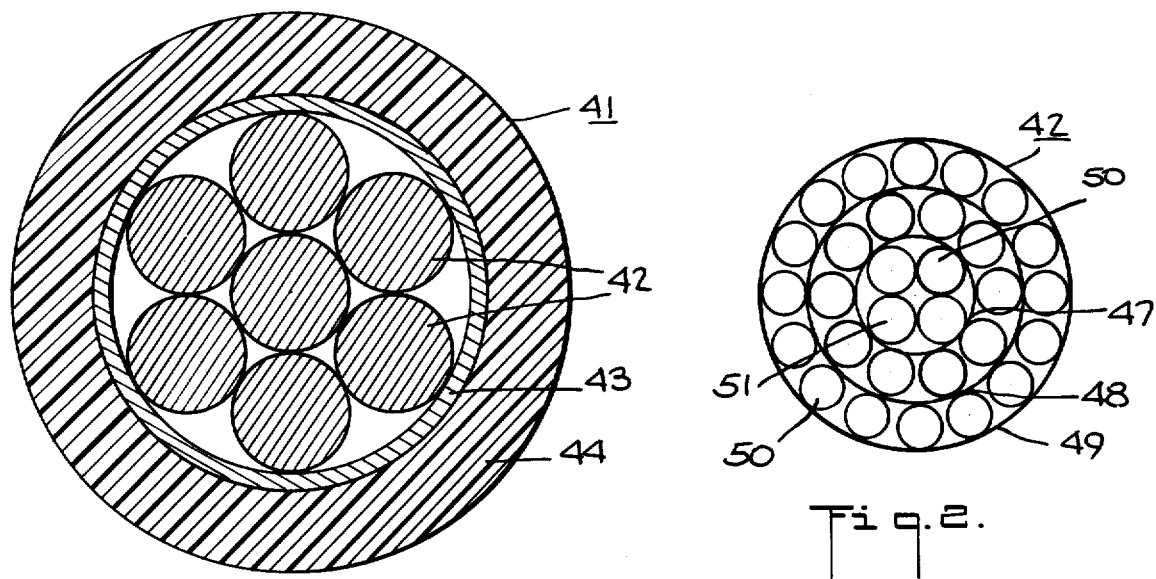
Fig. 1.
Fig. 2.
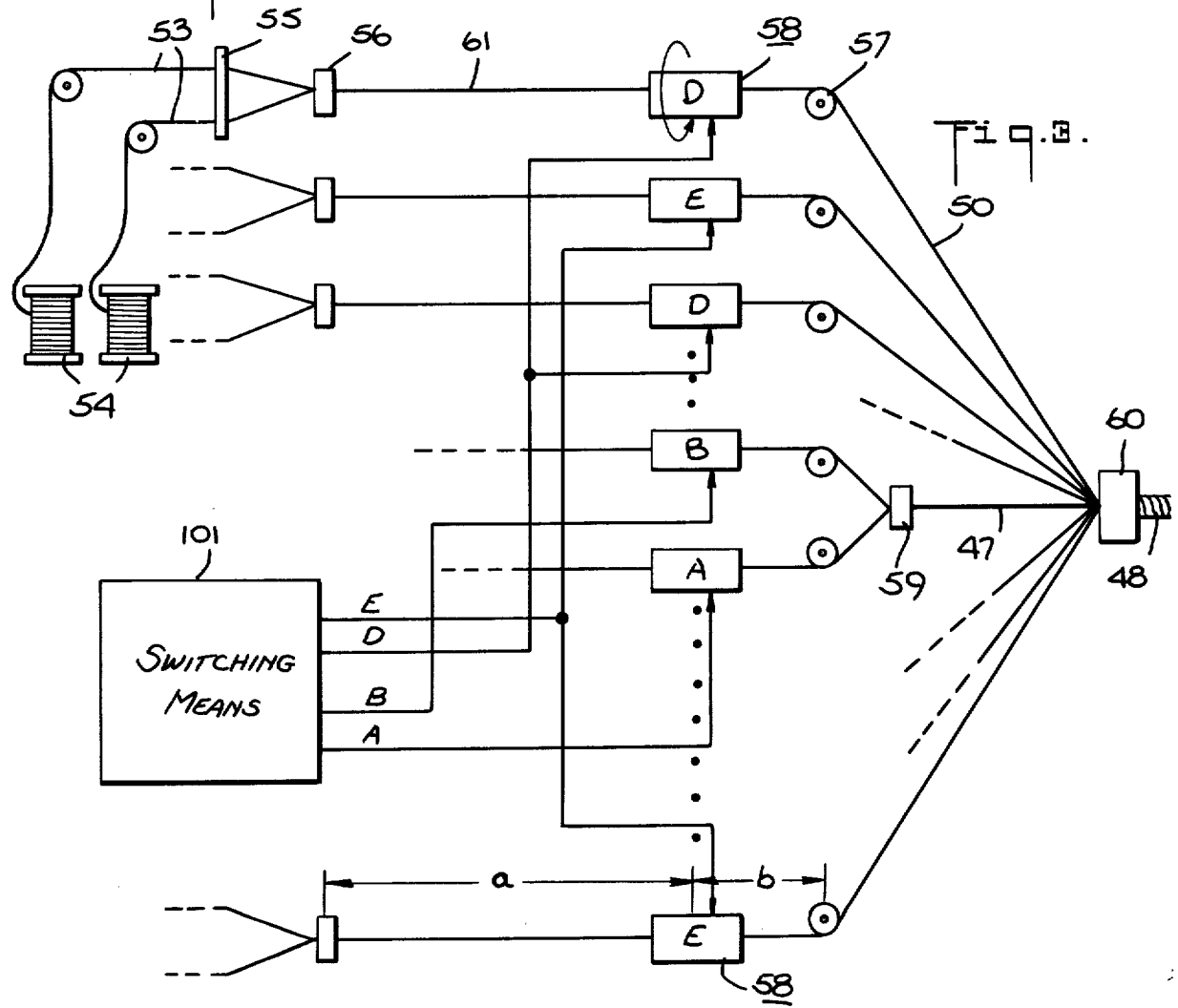
Fig. 3.

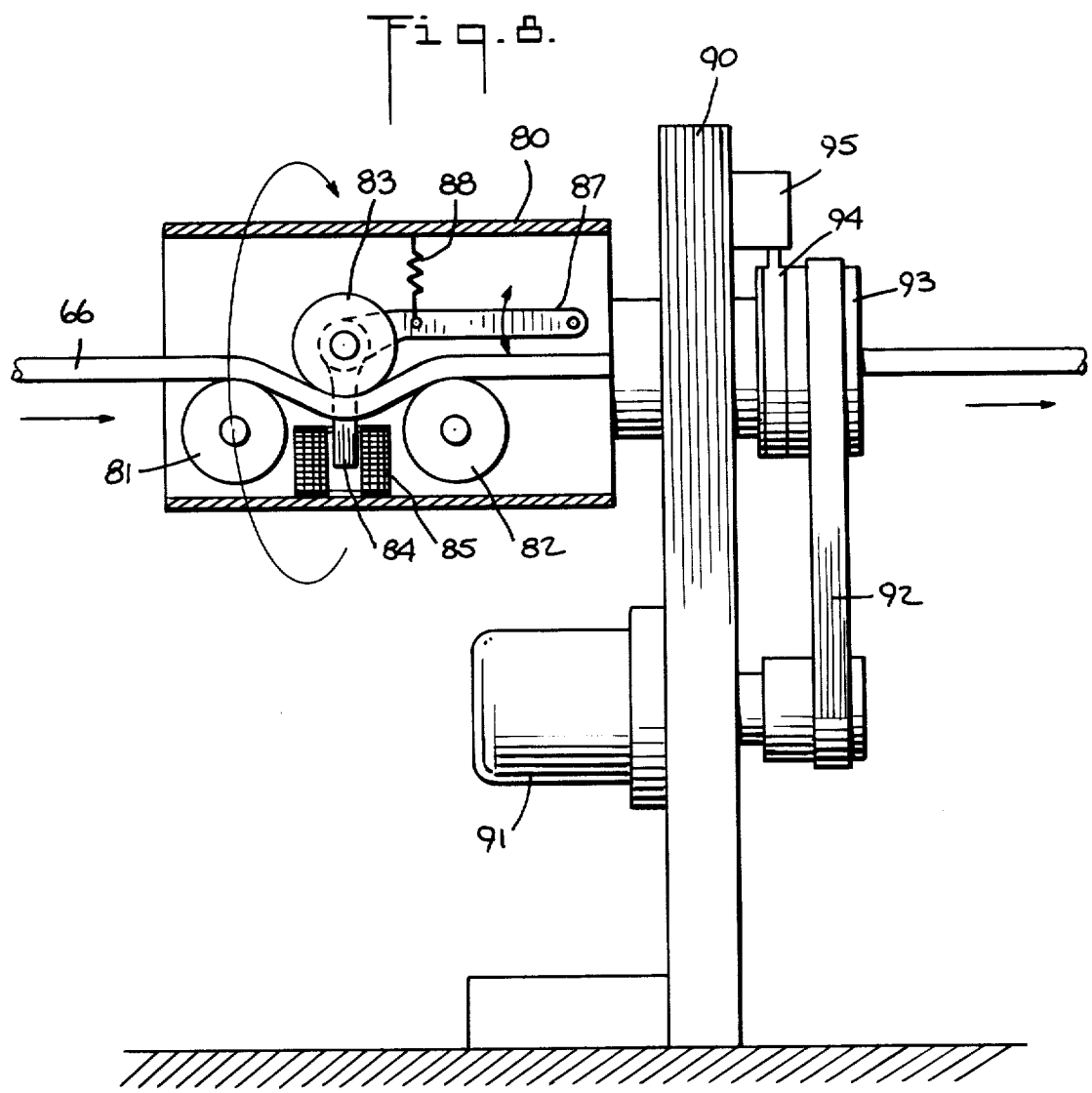

3,884,025

METHOD AND APPARATUS FOR MAKING SZ-TWISTED COMMUNICATIONS CABLE

BACKGROUND OF THE INVENTION

Recently new methods and apparatus for the manufacture of electrical cables particularly communication cables have been developed. Whereas the plurality of steps required to make such a cable were formerly done separately, these new methods and apparatus permit performing the carious steps in a single operation. Typically in making cables of this nature wires are twisted to form pairs or spiral quads and the pairs or spiral quads then twisted to form basic groups. In such twisting the wires, also referred to as elements are twisted into units with a twist that alternates between a left hand twist and a right hand twist. Twisting of this nature is generally referred to as SZ twisting and with presently available types of apparatus has the advantages that elements to be stranded and twisted can be unwound from stationary unwinding frames, twisted and the resulting units further processed all in a single operation.

Generally in the presently available methods for SZ twisting the twisting is performed using rotating section storage devices referred to as accumulators in which either the velocity of the strand running through the twisting device or the rotary motion or the content of the accumulator is changed at intervals to vary the length and direction of lay of the twisted unit. Generally by changing one of these parameters e.g. velocity, rotary motion or accumulator content, the stranded units produced will have a section of constant length of lay in one direction followed by a similar section with twist in the opposite direction. It is however also possible through control of these parameters to produce units which have lengths of lay which differs from section to section or which change continuously within a section of constant twist direction. It is also possible by proper control to vary the distance of the reversal points of the twist directions.

Not all SZ twisting methods make use of the above mentioned accumulators. In these other methods, the stranding elements to be twisted are first combined into a strand and then twisted while in a stretched condition between two twisting points using one or two twisting heads. The twisting heads either continuously frictionally grip the strand in the circumferential direction or in some cases alternately grip and release the strand from section to section. Such devices are designed to that they do not appreciably affect the pulling through of the strand. Devices of this nature are described in U.S. applications Ser. Nos. 372,340, filed June 21, 1973, now U.S. Pat. No. 3,823,536; and 341,773, filed Mar. 15, 1973. Such a device is also disclosed in the magazine "Draht" Vol. 22 [1971], No. 9 pp. 619–625. In one method of using a device of this nature the stranding elements are combined into a strand and are run through the twisting portion between two stationary twisting points with the distance between the first twisting point and the point of attack of the twisting head greater than the distance between the point of attack of the twisting head in the second twisting point. Generally the change of the process parameters which result in a change of twist direction from section to section is accomplished at intervals corresponding to at most three times the length of time for a longitudinal section of the strand to move from the first twisting point to the first twisting head. Such a method is discussed in the above reference U.S. Ser. No. 372,340, now U.S. Pat. No. 3,823,536 in which German Pat. No. 1,765,452 corresponding to U.S. Pat. No. 3,593,509 is discussed. In such a device if the speed of rotation of the twisting head is changed in steps, the SZ stranded unit produced will have within a section of constant twist direction, a length of twist or lay which changes continuously in the longitudinal direction of the stranded unit. Several such stranded units can be subsequently twisted together in a serial operation to form a twisted group, i.e. two SZ twisting devices in parallel may twist two sets of elements into two units which are then combined into a twisting device in series therewith into a twisted group. In such an operation in order to insure good electrical decoupling of the SZ stranded units which are twisted together to form the group, the rotary motion of the twisting heads in the two parallel twisting devices forming the twisted units should be changed at different points of time. Alternately in such operation, the speeds of rotation and/or directions of rotation can be adjusted to be different in the two parallel devices. Through one of these methods a different pattern of the length of lay in the two adjacent units which are being twisted to form a basic group is obtained. In another type of operation wherein wires or elements are SZ twisted to form pairs, which pairs are then, in serial fashion, twisted to from a group, the pairs are combined into a strand and are similarly twisted to form a twisted group between two twisting points. In this method however, the twisting points travel along with the stranding elements in the direction in which the strand is being pulled so that there is always a certain length of strand section being twisted and so that subsequently a new strand section enters the torsioning section between the two twisting points and is then twisted. Such an arrangement is shown in U.S. Pat. No. 3,025,656. With such a method it is possible to select a degree of twist of one pair of wires to be different from another pair and in addition to have a length of lay which, although remaining constant within a section of the same twist direction changes from section to section. The result is an electrical cable in which pairs of wires immediately adjacent within a twisted group have different lengths of lay.

Although all these previous methods work to some degree or another, they have various drawbacks which point to the need for a simple and effective method which will permit manufacturing SZ twisted cables in such a manner that cross talk between elements and units within the cable is kept to a minimum.

SUMMARY OF THE INVENTION

The present invention provides such a device and method and an improved cable made according to that method. The communications cable is composed of balanced SZ stranded units which are then twisted to form a core over which at least a second layer is twisted. Essentially, the present invention comprises twisting stranding elements into a plurality of twisted units each being SZ twisted in the manner described above, twisting some of the units to form a core or first layer and other of the units to form at least a second layer over the first layer. Each of the basic units used in the core and other layers are essentially the same but are twisted such that adjacent units in any layer have a predetermined distribution function which varies from that of adjacent units and that the units in one layer have predetermined distribution functions which differ from those in an adjacent layer. Essentially, each of the stranded units has a length of lay which varies in the direction of the cable according to this predetermined distribution function.

For the purposes herein, distribution function may refer to one of several factors which will cause differences in the cable unit which differences are effective to substantially reduce cross talk between adjacent units. The first type of distribution function is one which is related to the length of lay. Thus, when referring to two units having different distribution functions in the first sense what is being referred to is two units having different lengths of lay. A second type of distribution function is related to the spacing of reversal points of twist direction. Thus when referring to this type of distribution function what is meant is that two cable units having different distribution functions will have different spacing between reversal points. Similarly different units may be said to have different distribution functions where, even though they may have the same length of lay and the same spacing of reversal points, they have a different starting phase. That is to say, where two identical units are being formed by two identical twisting devices which are operated in phase, the reversal points and length of lay of the two units will be the same and when these two units are subsequently twisted together the reversal points will be coincident. In such a case the starting phase of both is the same and they both have the same distribution function. However, if through the spacing of the device or the relative times of reversal of twist direction, the points of reversal are caused to occur at different distances or at different times with respect to the subsequent twisting, the two reversal points will not coincide when the two units are twisted together. This is considered a third type of situation where the distribution functions of two adjacent units are different.

As indicated above the essential feature of the present invention is in insuring that the distribution functions of adjacent cable units in a layer are different and that the distribution functions between adjacent layers are also different. Where the number of units in a group or layer is even only two different distribution functions are required within that layer, which functions alternate from one unit to the next. However if the number of stranded units is odd, a third distribution function must be provided for at least one unit in the group so as to not have two units adjacent to each other having the same distribution function. In similar fashion only two additional distribution functions are required for a plurality of layers, again assuming an even number in the other layers. With an odd number in an additional layer then an additional distribution function would be required in that layer. Thus, indicating the distribution functions of the first layer or core group as A and B respectively, that group will have units alternatingly having A and B distribution functions. Aa next layer of units which is twisted on top of the first layer will then have units whose distribution functions alternate between functions designated D and E. A third layer may be twisted atop the second layer with the third layer having distribution functions A and B again. Such an arrangement satisfies the above requirements i.e. adjacent units in a group or layer having different distribution functions and the units in one layer having different distribution functions from those in an adjacent layer.

An additional type of distribution function which permits having, for example, only two different types of distribution functions even though two or more layers are provided should be noted. This comprises varying the twisting of a layer atop an earlier layer or core so as to have a different or varying layer length of lay or in modulating the layer length of lay to result in the adjacent units in the two layers effectively having different distribution functions. That is to say, normally the twisting of the second layer comprising a plurality of cable units on to the first layer or core would be done with a constant length of lay. In such a case the distribution function of the units in the second layer must be made different than those in the first layer. However, if the twisting of the layer atop the core is modulated so as to vary the length of lay of the layer, then the same distribution functions may be used in both layers. Thus this latter method provides a method in which only two basic types of cable units need be produced to end up with a multilayer communications cable which has effective decoupling of the SZ stranded units which go to make up that vable.

Various means and methods for carrying out the present invention are disclosed. Generally these use presently existing SZ twisting device. A type of twisting device particularly well suited for performing the twisting of the pairs of elements going to make up the basic units used in twisting the core and subsequent layers is that described above in which the strand is held tightly between two twisting points and frictionally gripped perpendicularly to the direction of movement by a twisting head which applies a torsion or twist to the strand. As noted above in such a twisting device the distance between the first or entrance twisting point and the point of attack of the twisting head is made greater than the distance between the point of attack of the twisting device and the second or exit twisting point. Also noted above was the fact that the process parameters in such a device are preferably changed at intervals smaller than three times the time required for a length element of the strand to move from the first twisting point to the twisting head. In the method of the present invention one such device will be provided for each unit to be made i.e. each unit in each layer which goes to make up the total cable. This permits subsequent serial twisting of the units into groups and the placing of subsequent layers on top of earlier formed layers in a single process. As described above, at least two different distribution functions are required no matter in what manner the cable is made. An effective way of obtaining two distribution functions is to switch process parameters synchronously at every other twisting device being used to make twisted units for a given layer. That is to say that for each layer, half of the devices (assuming identical devices) being used to make up units for that layer will be switched at one point in time and the other half at a different point in time, thereby providing at least two different distribution functions in the units so produced. It is also possible with proper design of the devices used in twisting the units to switch the process parameters of all devices at the same time (i.e. by using unidentical devices).

Two types of switching variation are possible. The switching rate of one group of devices may be different than that of the other resulting in varying lengths of lay or distance between reversal point, or the rate may be the same with the time of switching varied to result in different starting phases.

As is evident from the background information given above the generation of different distribution functions can be carried out in many different ways. In the first place there is the possibility of generating any of the three types of distribution functions described above. Thus, phase may be varied by changing the relative time of switching or relative locations of the different twisting devices with respect to each other. Similarly the length of lay and/or spacing of reversal points may be changed by varying from device to device the switching rate or the placement of the twisting heads with respect to each other as well as their placement with respect to the entrance and exit points of each device. Similarly speeds and/or direction of rotation of the twisting heads in the different devices or other functions of the device which affect the twisting may be varied from device to device.

A preferable arrangement however as disclosed herein is the arrangement of the twisting devices in a plane which is normal to the twisting axis of the group or layer i.e. the twisting axis of the device in which the units after being individually twisted will be then twisted together. In one embodiment all twisting devices being used for a twisting layer are placed in the same plane. With this arrangement every other twisting device will be switched simultaneously at a different rate in the manner described above. This will vary the distribution functions by varying the length of lay or point of reversal of twisting points.

Another manner of obtaining different distribution functions is shown in which each of the twisting devices have the same distribution function but wherein the twisting devices are displaced from one another to vary the phase of distribution on adjacent cable units thereby effectively varying the distribution functions. Such phase variations may be done from layer to layer and may also be done within a layer itself. In one illustrated embodiment the two different distribution functions e.g. A and B are used with the twisting devices for one layer lying in a first plane perpendicular to the twisting axis of the twisting device twisting the units into a group, and twisting devices also having distribution functions A and B for the second layer in a plane displaced from the first plane by more than 5 percent of the length of a section having a constant twist direction. With such an arrangement the parameters in all twisting devices may be changed at the same point in time. When displacing twisting units from one another, it is important that the displacement be no more than the length between reversal points of twist direction on the SZ twisting units.

As noted above it is also possible to modulate the length of lay when twisting the units of a twisting layer into a layer on top of another layer. One manner of doing this is through the use of a laying top which is movable back and forth in the direction of the twisting axis. Such a device is shown in German Pat. No. 1,490,335. Such modulation may also be accomplished using a second twisting arrangement disposed behind the corresponding laying top for that twisting layer. For operation in this manner two twisting heads may be arranged in tandom and one twisting head adapted to always grasp and twist the layer with a friction force and further adapted to change its rotary motion from section to section. In this tandom arrangement it is also possible to have one twisting head grasp the layer at all times and always rotate with the same motion while the other twisting head which is stationary with respect to the twisting head which continually grasps the layer alternatingly grasping the layer from section to section i.e. for one section the second twisting head will grasp the layer and twist it; but during the next section the second twisting head will be released and impart no twist to the layer. Also for this purpose a revolving accumulator which changes its rotary motion from section to section may be used. Any one of these types of devices will effectively modulate the layer which is being twisted on top of another layer thereby effectively changing its distribution functions with respect to the other layer and permitting the same types of twisting distribution functions in the units of both layer.

An additional embodiment is illustrated in which the twisting devices used for twisting the stranding elements into units along with their runoffs and entrance points are mounted for rotation about the axis of the twisting device for the layer. In the illustrated embodiment, the individual twisting devices are arranged in a circle.

As noted above, the twisting heads used preferably should grip the stranding elements frictionally in the direction of the circumference of the rollers of the twisting heads in such a manner as to firmly hold the strand but to still allow it to be easily pulled through. To accomplish this a particularly advantageous twisting head which comprises essentially one or several pairs of rollers arranged on parallel axis and facing each other and in which the strand elements run between the running surfaces of the rollers and are frictionally gripped thereby is shown.

Each of the arrangements of devices described above can be operated using twisting devices which are identical i.e. have the same distances between the entrance point of a torsioning section and the twisting device and the device and between the twisting device and the exit point of the torsioning section. It should be noted however that different twisting devices which provide different distribution functions of the effective length of lay of the SZ stranded units can also be used.

BRIEF DESCRIPTION OF THE DRAWINGS

FIG. 1 is a cross sectional view illustrating a communications cable made up of a plurality of groups of twisted cable units.

FIG. 2 is a cross sectional view illustrating the make-up of one of the twisted cable groups used in the cable of FIG. 1.

FIG. 3 is a block diagram illustrating the serial manner in which the cable group of FIG. 2 can be made.

FIG. 8 illustrates a twisting head which can be alternately engaged and disengaged and is useful in some embodiments of the present invention.

DETAILED DESCRIPTION OF PREFERRED EMBODIMENT

Figure 4:
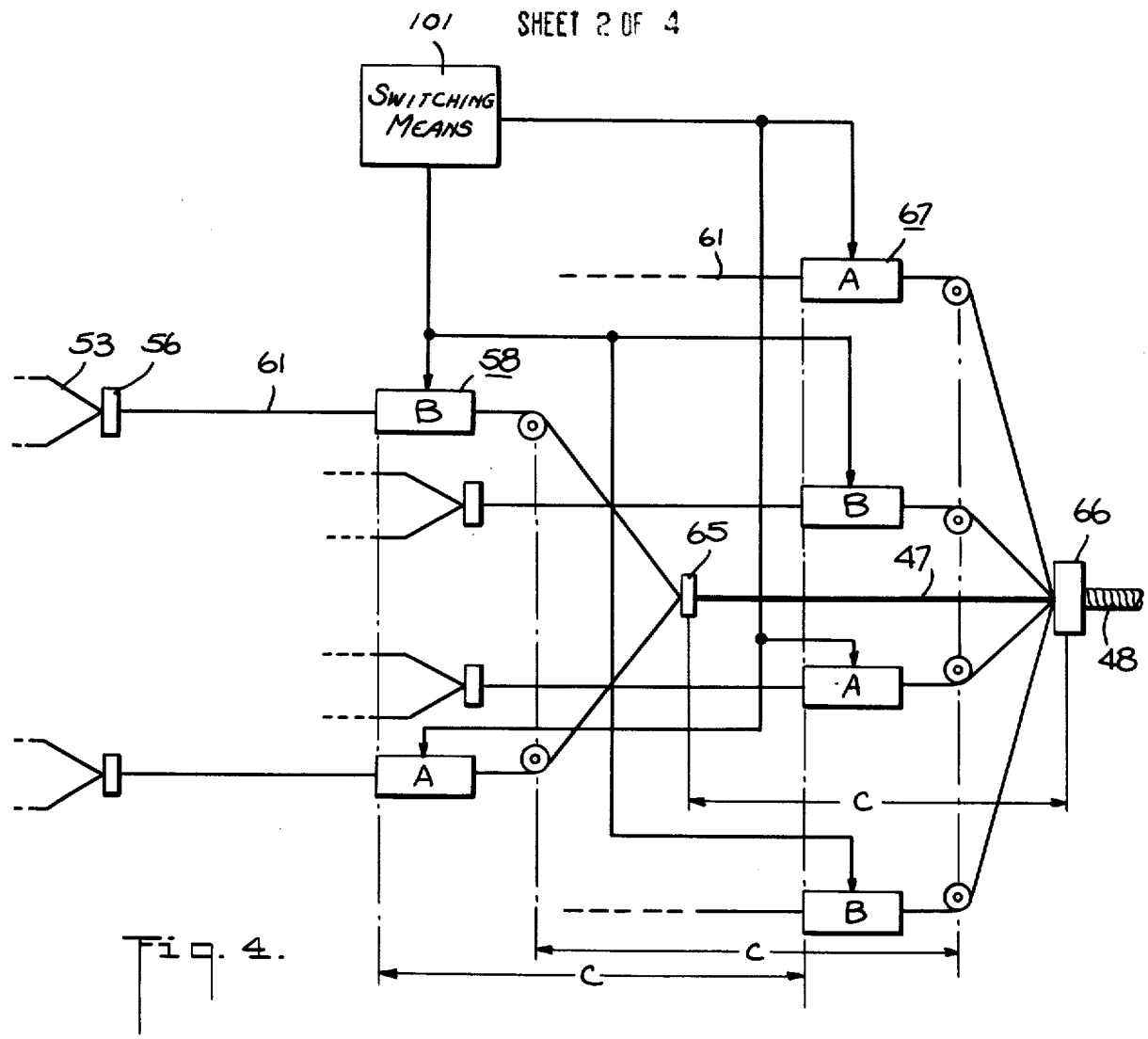
FIG. 4 illustrates an alternate embodiment for making the cable group of FIG. 2.

FIG. 1 illustrates a communications cable 41 made up of seven layer-twisted groups 42. The cable core is surrounded by a core covering 43 on top of which a plastic jacket 44 is supplied. The plastic jacket may be a type of jacket known as a layer jacket on the inside of which is provided a covering which is impermeable to water vapor and which is formed by a thin metallic longitudinally introduced ribbon, or may be a covering in which such a ribbon is embedded. Each of the seven groups 42 of the cable 41 comprises, as shown on FIG. 2, 28 stranded units 50 twisted together with each other to form layers. As shown on FIG. 2 the innermost layer 47 is formed from two stranded units 50 which are twisted together with two dummy units 50 and the outermost layer 49 is formed of 16 stranded units 50. Typically the stranded units 50 will be plastic insulated pairs of wires.

To insure adequate decoupling of the stranding units 50 from each other, the units 50 which are immediately adjacent each other within a twisting layer and those units in adjacent twisting layers should have different distribution functions as described above. One manner of obtaining these different distribution functions is to twist the pairs in the innermost or core layer such as to have alternating distribution functions designated A and B respectively. The units of the middle layer 48 may then be twisted with each other so as to have alternating distribution functions D and E. In the third twisting layer 49 the distribution functions A and B used in the innermost may be repeated.

A group 42 twisted in this manner will exhibit good electrical decoupling of the stranded units from each other, because of the different distribution functions within a twisting layer and between adjacent layers.

An example of an embodiment of an apparatus for manufacturing this type of group is illustrated by FIG. 3. Each of the pairs of wires going to make up the units 50 are taken from stationary reels 54 of which only two are shown in detail and led over appropriate rollers to a distribution disc 55 from which they are led to a laying top 56 which forms the entrance or first twisting point and where they are formed into a strand 61. The strand 61, is then led through a twisting device 58 from which it passes over a deflection roller 57 which forms the exit or second twisting point from which the cable 50 from the twisted unit 58 is led to a twisting device 60 wherein a plurality of twisted pairs or units are twisted into a group 48. For each pair to be twisted, the twisting device 58 is provided with a distance a between the twisting device 58 and the laying top 56 which is greater than the distance b between the twisting 58 and the deflection roller 57 at the exit. As indicated by the lettering in the blocks representing the twisting device 58 two twisting devices having the distribution functions respectively A and B are provided to twist the pairs 50 of the innermost group of FIG. 2. These two pairs are then provided to a twisting device 59 where they are combined with the two dummy pairs [not shown] to be twisted into the innermost group or core group 47. Also provided for twisting the middle layer 48 are a plurality of twisting devices 58 having their blocks labeled alternatingly D and E to twist the ten units or twisted pairs which go to make up this layer. Only four of the twisting devices are shown on the figure. However, it will be recognized that in practice ten such devices will be provided to form the layer 48 of FIG. 2. The twisted pairs 50 formed by the twisting devices 58 labeled D and E, are fed along with the core group 47 to the twisting device 60 wherein the units 50 are twisted in a layer over the core group 47 to form the layer 48. Additional twisting devices will be provided having the distribution functions A and B for twisting the sixteen pairs which go to make up the layer 49 which will then be twisted on top of the layer 48 in an additional twisting device similar to twisting device 60. This last step is not shown on the figure in order to maintain simplicity. In the embodiment shown, the twisting device 60 will be a well known pulling and winding device which always rotates with the same direction and speed of rotation.

To obtain the different distribution functions A, B, D and E, the twisting devices 58 are operated differently. In order to obtain these different distribution functions the different twisting devices may have different speeds of rotation and/or directions of rotation. For each of the layers, only two different modes of operation are necessary i.e. for the layer 47 one twisting device will operate to provide a distribution function A and the other a distribution function B. For the layer 48 half of the twisting devices will be operated to provide a distribution function D and the other half to provide a distribution function E. These different distribution functions may be achieved by varying the various parameters as described above from twisting device to twisting device. As shown, all of the twisting devices 58 are arranged in a plane normal to the twisting devices 59 and 60.

A switching means 101 is shown having four outputs A, B, D, and E which provide switching commands to the various twisting devices. Switching means can comprise conventional control means and may include, for example, stepper switches adapted to provide outputs at a predetermined switching rate which will result in the desired distribution function. Such switching rate should follow the guide lines discussed above in the summary, i.e., at intervals smaller than 3 times the time required for a length element of strand to move from the first twisting point to the twisting head.

With the twisting devices initially set up to have different distribution functions, switching of parameters may be done simultaneously for all twisting devices. In this case, only a single set of outputs from switching means 101 could be required to provide switching inputs to all switching devices, i.e., the lines A, B, D and E could all have the same switching outputs thereon. As an alternate to this, only two twisting distribution functions i.e. A and B may be provided for all layers and the switching of the parameters in the devices for each layer done at a different time to thereby vary the phase and effectively obtain different distribution functions. That is the twisting devices 58 associated with the innermost group 47 may be switched at one point in time and the switching devices 58 associated with the second layer switched at another point in time. In that case, only two separate switching lines A and B out of the switching means 101 would be provided.

In this embodiment just described the distances a and b between the entrance point and the twisting head and the twisting head and the exit point were assumed to be equal in each of the twisting devices and the different distribution functions obtained by variations in parameters such as speed and direction of rotation. However different distribution functions may also be obtained by variation in the distances a and b from twisting device to twisting device.

A second type of twisting device is illustrated by FIG. 4. Operation is similar to that described above with the primary difference being in the location of the various twisting devices. As shown on FIG. 4, the twisting devices 58 associated with the innermost layer 47 are displaced from the twisting devices 67 associated with the layer 48 by a distance C. Also as shown only two distribution functions A and B are used. Thus the twisting devices 67 are all arranged in a first plane perpendicular to the twisting axis of twisting device 66 and the twisting devices 58 in a second plane perpendicular thereto. With this arrangement, all twisting devices may be switched at the same time with the displacement between the twisting devices of one group with respect to another providing a phast offset which effectively causes the two groups to have different distribution functions in the manner described above and thereby maintains the necessary decoupling. To maintain adequate decoupling the distance should be equal to or greater than the length of reversal points of SZ twisted units 50. Such will be achieved if the distance is larger than about 5 percent of the length of a section of a pair of wires having the same twist direction. For example, if sections are twisted with the distance a on FIG. 3 five meters and the distance b 0.5 meters, the length of a section of a SZ unit having the same twist direction is 10 meters. Under these conditions a preferred displacement of the two planes is 1 meter.

Similarly, different distribution functions within a layer may be achieved by displacement of the devices associated with that layer. That is, the devices 67 could be displaced with respect to one another to obtain the different distribution functions through differences in initial starting phase. Similarly in the manner described above, the two phases A and B illustrated on FIG. 4 may be obtained by switching at different times or at different rates or by setting up different initial conditions in the twisting devices.

In a manner similar to that described in connection with FIG. 3, the sections a and b of the various torsioning devices may be equal for all twisting devices. However additional decoupling may be achieved if the units in adjacent twisting layers are twisted by devices having different lengths of the sections A and B.

Figure 5:
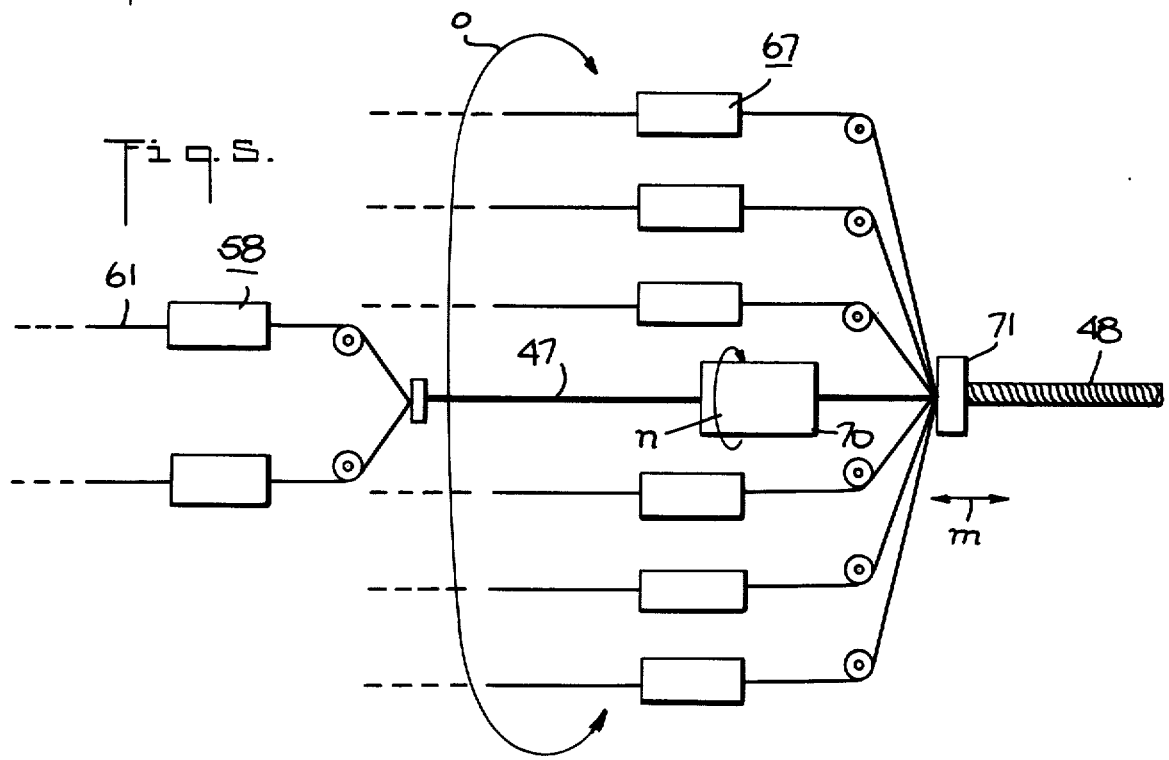
FIG. 5 illustrates an additional embodiment useful in making the cable group of FIG. 2.

A further embodiment for making a cable group such as shown on FIG. 2 is illustrated by FIG. 5. In a manner similar to that described in connection with FIG. 4 the twisting devices 58 for twisting the units going to make up the group 47 are in one plane and the twisting devices 67 which go to make up the layer 48 in a different plane. In this embodiment however an additional variant is introduced. The length of lay of the layer 48 is modulated as it is twisted over the inner group 47. One manner of achieving this is to use, rather than the type of rotating and pulling device which was described above, a twisting device 71 which is capable of moving back and forth in the longitudinal direction as indicated by the double-headed arrow M. Such motion will modulate the length of lay of the layer 48 on top of the layer 47 and provide additional decoupling. Devices of this nature are well known in the art and are shown for example in German Pat. Nos. 915,352 and 1,490,355.

The same effect may be achieved by using a second twisting device 70 whose rotary motion about the twisting axis is indicated by the arrow M. This may be a twisting device whose rotary motions and/or direction of rotation is changed at intervals. It may for example be a twisting head which grabs the twisting layer 47 in a stretched condition with a friction force in the circumferential direction or an accumulator which changes its rotary motion section by section.

Twisting device 70 may also be a twisting device which alternatingly grasps and releases the strand in a manner to be described below in connection with FIG. 8.

FIG. 5 also illustrates a further manner of achieving modulation of the length of lay of the layer 48. In this embodiment the twisting devices 67 are supported in a circular arrangement along with their associated entrance and exit points for rotation about the axis of the twisting device 71 as shown by the double-headed arrow O. In operation the twisting head 67 supported and arranged in circular fashion are rotated about the axis with a speed and/or direction of rotation which is changed either continuously or at intervals. It should be noted that this arrangement may also be used to replace the twisting device 70 and thus to provide for the twisting of the layer 48 on top of the layer 47. Preferably the twisting devices used in the present invention will grip the pairs of wires [or larger groups of wires i.e. spiral quads, as the case may be] so that the strand is in a stretched condition with friction applied thereto in the circumferential direction of rollers in the twisting head such as to tightly hold the strand but not impede the pulling through thereof. Also useful in certain embodiments is a twisting head which has the ability to grip or not grip the strand which is being pulled through.

Figure 6:
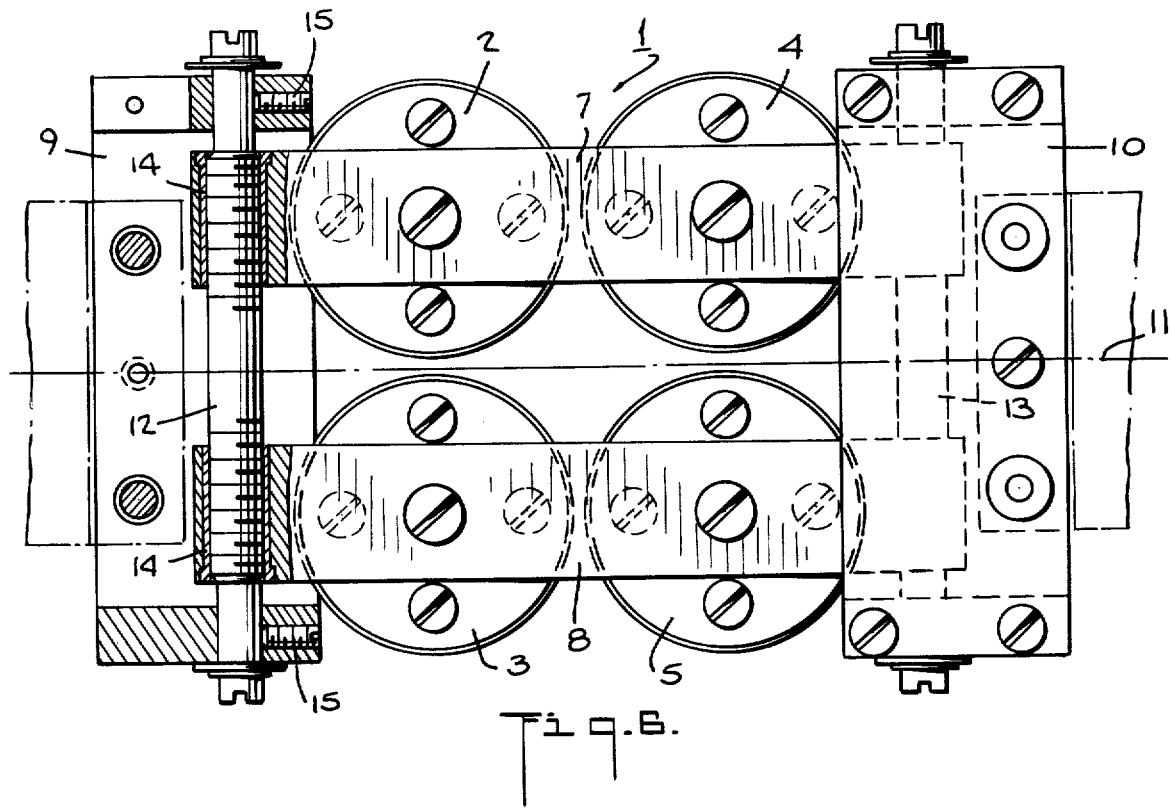
FIGS. 6 and 7 illustrate an embodiment of a twisting head which may be used in the devices of the present invention.
Figure 7:
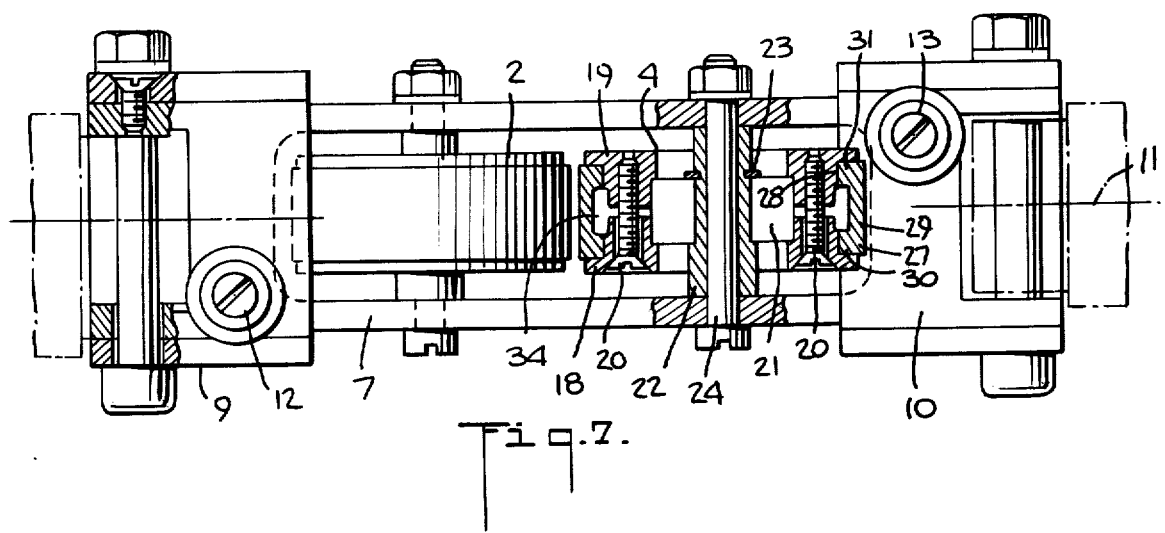

An example of an embodiment of a twisting head which grasps the strand running through at all times is shown on FIGS. 6 and 7.

A particularly advantageous twisting head for use in the twisting devices of the invention is illustrated by FIGS. 6 and 7. The twisting head, designated generally as 1, and which will be called a roller twister comprises essentially the two pairs of rollers 2 and 3 and 4 and 5. The two rollers of each pair are arranged on parallel axis and disposed with their running surfaces opposite each other. The rollers 2 and 4 are supported by an upper roll carrier 7 and the lower rolls 3 and 5 by a lower roll carrier 8. The roll carriers 7 and 8 are attached at one end to a left hand frame 9 and at the other a right hand frame 10. The entire twisting head is rotatably supported in conventional fashion about the axis of rotation 11. Although two pairs of rollers are shown herein, a single pair may be used as may a plurality of pairs greater than two. To adjust the spacing of the upper and lower rollers so that they may handle different sizes of strand 51, spindles 12 and 13 which are provided with a left handed thread at one end and a right handed thread at the other end are provided in frames 8 and 9. The upper and lower frames 7, 8 are guided by respective threaded sleeves 14 engaging the threaded portion of the spindles 12 and 13. A set screw 15 is provided to hold the spindles in place once the desired setting has been made.

The construction of each of the rollers 2, 3, 4, 5 is illustrated in FIG. 7 which is a plan view of the assembly of FIG. 6. In FIG. 7, the roller 4 is shown in a cut-away cross section. Essentially, it is made up of two roll halves 18 and 19 which are of symmetrical design and bolted together by bolts 20. The two halves are pressed against the outer race of a ball bearing which is axially secured to a sleeve 22 by means of a snap ring 23. The roller shaft 24 is led through the sleeve 22 and holds the roller between the upper roll carriers 7. The two halves of the roll 18 and 19 contain a grooved portion around their circumference. Into this groove 28 is fitted a friction winding 27 which is a rubber elastic material. The friction winding 29 is of a U-shaped cross section with its legs 30 and 31 abutting the inner surface of the groove 28. The bottom or base 29 of the U forms the running surface which grips the strand 45 of FIG. 1. The hollow space 34 results in the ability flex and thus to firmly grip the strand 45 preventing any motion which would cause it to slip out from between the rollers but still permitting ease of pulling through the rollers. Ideally the friction lining 27 will be a closed ring which can be inserted into one of the sides 18, 19 prior to assembly. In addition the bottom of the groove should be painted with an adhesive prior to assembly so that the legs 30 and 31 will be firmly bonded to the bottom of the groove 28.

Particularly useful as a friction lining is a material having a basis of polyurethane such as that marketed by the Bayer-Leverkusen under the tradename "Vulkollan".

A twisting device of the type which can grasp or not grasp the strand running through is illustrated by FIG. 8. The twisting head comprises two fixed rollers 81 and 82 supported in conventional fashion on fixed bearings so that only rotational motion of the roller is possible. In addition there is provided a roller 83 mounted to an axle which is secured to a lever arm 87 for rotation. A spring 88 is attached to the lever arm 87 to normally hold the roller 83 above the strand 66 passing through the twisting head 80. When in this position the strand 66 will pass through without any torsion being applied thereto. An electromagnet 85 is provided along with a core 84 attached to the lever 87. Energization of the electromagnet 85 will draw the core downward to the position shown so that the strand 66 will be firmly grasped between the rollers 81, 82 and 83 so that any rotational motion of the twisting head 80 will impart a torsion to the strand 66. Twisting head 80 is supported for rotation in a frame 90 and is driven by a motor 91 through a belt 92 attached to a drive pulley 93 coupled to the twisting head 80. As shown the drive pulley 93 has thereon a slip ring 94 contacting a brush 95 which is used to operate the electromagnet 84. In this manner the grasping and the releasing of the strand 66 will take place automatically thereby imparting modulation in the manner described above.

Thus an improved method of twisting a communication cable and an improved communication cable obtained therefrom have been disclosed. Although specific embodiments have been illustrated and described, it will be obvious to those skilled in the art that various modifications may be made without departing from the spirit of the invention which is intended to be limited solely by the appended claims.

What is claimed is:

1. A method for manufacturing communication cable which is made up of at least two layers of twisted cable units comprising the steps of:

a. twisting a plurality of stranding elements to form a plurality of cable units, each having an SZ twist in essentially identical separate twisting devices in which the stranding elements are formed into a strand which is held in a stretched condition between a fixed entrance point and a fixed exit point, said twist-device having a twisting head which grasps the strand perpendicular to its axis between said entrance and exit points with said twisting head arranged so that the distance between the exit point and the point of attack of the twisting head is smaller than the distance between the point of attack of the twisting head and the entrance point;
 b. twisting the units so formed in series therewith to form a twisted group; and
 c. switching the process parameters affecting the twisting of the strand of every other twisting device forming said units at the same time at intervals which are smaller than three times the time required for a length element of strand to move from the first fixed point to the twisting head at one of a rate and a phase which is different from the switching of the remaining twisting devices.

2. Apparatus for forming a twisted communication cable comprising:

a. a plurality of SZ twisting devices each having a first fixed entrance point wherein a plurality of elements are formed into a strand and held in a stretched manner between said first fixed point and a second fixed exit point with a twisting head between said first and second fixed points with the distance between the point of attack of said twisting device and said exit point smaller than the distance between said point of attack and the entrance point, said twisting head being such as to surround its respective strand gripping said strand in a circumferential direction;
 b. first means to twist a first plurality of the units formed by said twisting devices into a first group;
 c. second means having a twisting axis coincident with the first means to twist a second plurality of said units in a second layer over said first group; and
 d. wherein the twisting devices associated with each of said first and second means for twisting are arranged in planes perpendicular to the axes thereof.

3. The invention according to claim 2, wherein the plurality of twisting devices associated with each of said first and second twisting means are in the same place and further including means to switch every other twisting device at a point in time different from the switching of the remaining twisting devices.

4. The invention according to claim 2, wherein the twisting devices associated with one of said first and second means for twisting are displaced with respect to each other to the direction of the twisting axis and further including means to switch all of said associated devices at the same time.

5. The invention according to claim 4, wherein the twisting devices associated with said first means for twisting are displaced from the twisting devices associated with said second means for twisting by more than 5 percent of the length of a section of the stranded units produced in said twisting devices having a constant twist direction and further including means to switch the twisting devices associated with said first and second twisting means at the same point in time.

6. The invention according to claim 5, wherein at least some of said plurality of twisting devices comprise two twisting heads arranged in tandem, one of which rotates and always grasps the stranding elements with a friction force and the other of which is stationary and includes means to cause it to grasp the stranding elements with a friction force which changes from section to section.

7. The invention according to claim 2, wherein the twisting devices associated with said first means for twisting are arranged in a plane which is different than the plane of the twisting devices associated with said second twisting means.

8. The invention according to claim 2, wherein said second means for twisting is mounted for back and forth motions in the direction of the twisting axis for modulating the length of lay of the twisting layer.

9. The invention according to claim 2 and further including third means for twisting in tandem with said second means for twisting and adapted to modulate the length of lay of the twisting layer formed thereby.

10. The invention according to claim 9, wherein said third means for twisting comprises a twisting head which grasps the twisting layer strand with a frictional force and includes means to change its rotary motion from section to section.

11. The invention according to claim 9, wherein said third means for twisting comprises a second twisting head which includes means to cause it to alternatingly grasp said twisting layer with a friction force.

12. The invention according to claim 9 wherein said third means for twisting comprises a revolving accumulator with means to change its rotary motion from section to section.

13. The invention according to claim 12, wherein said twisting devices are arranged in a circle about said twisting axis of said second twisting means.

14. The invention according to claim 2, wherein the twisting devices associate with said second twisting means are arranged so that they can be rotated together about the twisting axis of said second twisting means.

15. The invention according to claim 2, wherein the distances between the entrance point of a twisting device and its twisting head and between said twisting head and the exit point of said twisting device is the same for all twisting devices.

* * * * *